United States Patent
Barbier

(10) Patent No.: US 10,815,854 B2
(45) Date of Patent: Oct. 27, 2020

(54) SYSTEM FOR INJECTING A NITROGEN OXIDES REDUCING AGENT INTO AN EXHAUST LINE OF AN INTERNAL COMBUSTION ENGINE VEHICLE

(71) Applicants: CONTINENTAL AUTOMOTIVE FRANCE, Toulouse (FR); CONTINENTAL AUTOMOTIVE GMBH, Hanovre (DE)

(72) Inventor: Pascal Barbier, Tournefeuille (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 0 days.

(21) Appl. No.: 16/466,793

(22) PCT Filed: Dec. 1, 2017

(86) PCT No.: PCT/FR2017/053347
§ 371 (c)(1),
(2) Date: Jun. 5, 2019

(87) PCT Pub. No.: WO2018/104629
PCT Pub. Date: Jun. 14, 2018

(65) Prior Publication Data
US 2020/0080454 A1   Mar. 12, 2020

(30) Foreign Application Priority Data
Dec. 6, 2016 (FR) .................... 16 61984

(51) Int. Cl.
*F01N 3/20* (2006.01)
*B01D 53/94* (2006.01)
*F01N 9/00* (2006.01)

(52) U.S. Cl.
CPC ......... *F01N 3/208* (2013.01); *B01D 53/9431* (2013.01); *F01N 9/00* (2013.01);
(Continued)

(58) Field of Classification Search
CPC ...... F01N 3/208; F01N 9/00; F01N 2610/146; F01N 2610/144; F01N 2610/10;
(Continued)

(56) References Cited

U.S. PATENT DOCUMENTS 8,468,810 B2 *  6/2013  Thomas ............... F01N 3/208
                                             60/303
8,701,389 B2 *  4/2014  Thomas ............... F01N 3/208
                                             60/286
(Continued)

FOREIGN PATENT DOCUMENTS

DE  10 2006 051724 A1   5/2008

OTHER PUBLICATIONS

International Search Report, dated Feb. 5, 2018, from corresponding PCT/FR2017/053347 application.

*Primary Examiner* — Hoang M Nguyen
(74) *Attorney, Agent, or Firm* — Nixon & Vanderhye

(57) ABSTRACT

Disclosed is a system for injecting an agent for reducing oxides of nitrogen into an exhaust line of an internal combustion engine vehicle, including: a pump for drawing the reducing agent from a tank and introducing it into the exhaust line; an injector for introducing the reducing agent into the exhaust line; an electronic unit for driving both the injector and the pump; a pipe for supplying the reducing agent linking the pump to the injector; an electrical cable for heating the supply pipe, the pump being arranged a certain distance away from the injector, and the electronic unit for driving both the injector and the pump being arranged in a module with the pump and connected to the injector via an (Continued)

electrical control cable, the latter being associated with the pipe for supplying the injector with the reducing agent.

20 Claims, 4 Drawing Sheets

(52) U.S. Cl.
CPC .... *F01N 2560/026* (2013.01); *F01N 2610/10* (2013.01); *F01N 2610/144* (2013.01); *F01N 2610/146* (2013.01)

(58) Field of Classification Search
CPC ........... F01N 2560/026; F01N 2610/14; F01N 3/2066; F01N 2610/1486; F01N 2610/1433; F01N 2610/105; F01N 2610/02; B01D 53/9431; F16L 53/38; H05B 3/58; Y02A 50/2325; Y02T 10/24
USPC ........... 60/285–286, 287, 301, 303; 123/472, 123/478
See application file for complete search history.

(56) References Cited

U.S. PATENT DOCUMENTS

| | | | |
|---|---|---|---|
| 2005/0042151 A1* | 2/2005 | Alward | C04B 35/624 422/177 |
| 2013/0025268 A1 | 1/2013 | Bauer et al. | |
| 2013/0140383 A1 | 6/2013 | Thomas et al. | |
| 2015/0075139 A1* | 3/2015 | Hembert | F01N 3/208 60/274 |
| 2018/0340456 A1* | 11/2018 | Pannuzzo | F01N 3/021 |

\* cited by examiner

SYSTEM FOR INJECTING A NITROGEN OXIDES REDUCING AGENT INTO AN EXHAUST LINE OF AN INTERNAL COMBUSTION ENGINE VEHICLE

The present invention relates to a system for injecting an agent for reducing oxides of nitrogen into an exhaust line of an internal combustion engine vehicle, including:
- a pump for drawing the reducing agent from a tank and introducing it into the exhaust line;
- at least one injector for introducing the reducing agent into the exhaust line by injection;
- an electronic unit for driving both said at least one injector and the pump;
- a pipe for supplying said reducing agent linking the pump to said at least one injector;
- an electrical cable for heating the pipe for supplying the reducing agent, the pump being arranged a certain distance away from said at least one injector, and the electronic unit for driving both said at least one injector and the pump being arranged in a module with the pump and connected to said at least one injector via an electrical control cable.

Typically, the supply pipe is heated at the start of the driving cycle when the temperature is such that there is a risk of the liquid being frozen, before the start of injection, then the temperature is subsequently maintained at low power so as to prevent the liquid from refreezing while the vehicle is in motion.

The incorporation of a system for injecting an agent for reducing oxides of nitrogen into a vehicle is complex since a pipe must be run between a pump module, generally placed at the rear of the vehicle in or in proximity to a reducing agent tank, and the one or more injectors placed in proximity to the engine. It must additionally be put together with electrical wiring modifications so as to allow an electrical connection between the electronic unit for driving the one or more injectors and the pump on the one hand and the one or more injectors on the other hand.

One commercial trend is to incorporate the electronic driver unit into the pump module, and hence the electrical wiring for driving the one or more injectors must also be routed from the rear of the vehicle to the front. Incorporating it in this way requires the electrical wiring for driving the one or more injectors to be run through an area that is very sensitive due to the heat because of the proximity of the catalytic converter. The present invention allows these problems to be overcome and further affords additional advantages.

Document DE 10 2006 051724 discloses associating two pairs of conductors, the main function of which is heating, with the SCR duct.

More specifically, the present invention relates to a system for injecting an agent for reducing oxides of nitrogen into an exhaust line of an internal combustion engine vehicle, including:
- a pump for drawing the reducing agent from a tank and introducing it into the exhaust line;
- at least one injector for introducing the reducing agent into the exhaust line by injection;
- an electronic unit for driving both said at least one injector and the pump;
- a pipe for supplying said reducing agent linking the pump to said at least one injector;
- an electrical cable for heating the pipe for supplying the reducing agent, the pump being arranged a certain distance away from said at least one injector, and the electronic unit for driving both said at least one injector and the pump being arranged in a module with the pump and connected to said at least one injector via an electrical control cable, characterized in that the electrical control cable is associated with said pipe for supplying said at least one injector with the reducing agent, the electrical control cable and the electrical heating cable consisting of a first single wire and a second single wire for the heating and control functionalities for said at least one injector, the injection system further comprising, in proximity to said at least one injector, or in said at least one injector itself, a diode means between the first and second wires, which is connected in parallel with the actuator of said at least one injector such that, the injection system comprising a device for reversing the control polarity:
- in the reverse direction of the diode means, the current flows through the actuator of said at least one injector; and
- in the forward direction of the diode means, the current shorts the actuator of said at least one injector while providing the heating cable functionality.

The solution provided by the present invention consists in combining the electrical power supply cable for the one or more injectors with the heated pipe for supplying the injector with the reducing agent so as to have to route only this pipe to the injectors.

This solution allows the complexity of incorporating the wiring for driving the reducing agent injector to be decreased. The heated pipe must be connected to the control module, and hence no additional connector is required by virtue of the present mention on the control module side. The electrical control wiring is able to benefit from the thermal protection afforded by the pipe in the areas close to the engine. This solution proposes a single pair of electrical wires to provide the heating for the pipe and the control for the injector, by virtue of a diode and a polarity inverter, and thus allows the number of connections to be optimized further by using the same electrical wires for both functionalities. The time taken up for controlling the injector is typically but not exclusively less than 50% of the total time. For example, the static flow rate of the injector will be chosen judiciously so as to achieve the required maximum flow rate of reducing agent by means of PWM (pulse-width modulation) control preferably including a determined duty cycle of opening, for example of less than 50%, allowing sequential heating between the injector opening control phases by using the available time (more than 50% in this example) from the PWM control. Combining both the heating and control modes allows sequential heating and injection. The electrical control cable and the electrical heating cable follows the same route.

According to one advantageous feature, the electrical control cable is incorporated within the pipe for supplying said at least one injector with the reducing agent.

According to one advantageous feature of the above, the electrical control cable is arranged within the hollow of the supply pipe through which the reducing agent flows.

According to one alternative to the preceding features, the electrical control cable is affixed to the outer surface of the pipe for supplying said at least one injector with the reducing agent.

In the preceding solutions, it is necessary to add two additional connection pins to the connector for the heated pipe on the pump side.

According to one advantageous feature, the electrical control cable and the electrical heating cable share a common ground wire.

The number of connections is thus optimized.

According to one advantageous feature, the resistance of the actuator is at least five times, preferably 10 times, as high as the resistances of the first and second single wires for the heating and control functionalities for said at least one injector.

The resistance of the actuator of the injector is thus high with respect to the resistance of the electrical heating wires. Because of this, in the injector control phases the energy dissipated in the heating resistors will be limited.

According to one advantageous feature, the static flow rate of the injector is dimensioned so as to achieve a required maximum flow rate of reducing agent by means of PWM control including a determined duty cycle of opening, preferably of less than 50%.

The invention further relates to a method for injecting an agent for reducing oxides of nitrogen into an exhaust line of an internal combustion engine vehicle by means of an injection system such as defined above, characterized in that it consists in:

heating the pipe for supplying the reducing agent without controlling the injector according to a first control polarity of said device for reversing the control polarity;

controlling said at least one injector according to a second control polarity of said device for reversing the control polarity, which is the opposite of the first control polarity.

According to one advantageous feature of the above method:

said at least one injector is controlled by means of PWM control preferably including a determined duty cycle of opening, for example of less than 50%;

the pipe for supplying the reducing agent is heated sequentially between the injector opening control phases by using the available time from the PWM control of said at least one injector preferably including a determined duty cycle of opening, for example of less than 50%.

According to this feature, the use of the entirety of the PWM control signal is optimized, both for controlling the injector and for heating the pipe during the signal time when the injector is not being controlled.

Figure 3A:
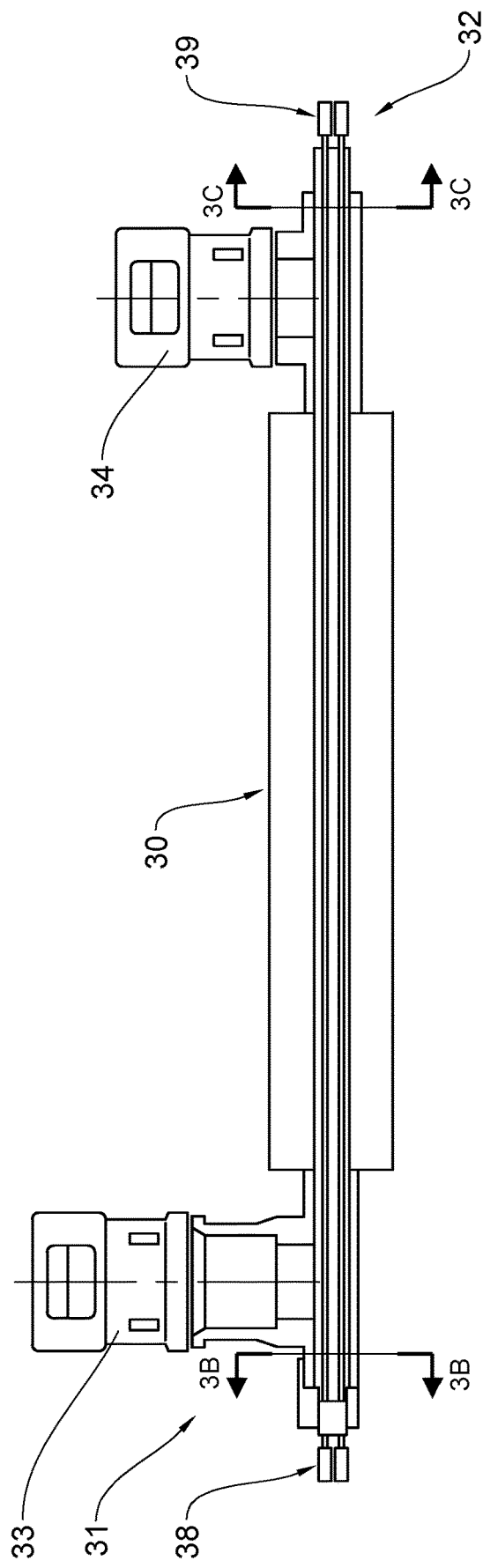
Figure 3C:
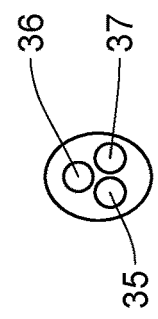
Figure 3B:
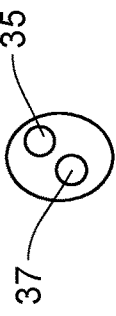

FIGS. 3A, 3B and 3C partially and schematically shows a second exemplary embodiment of a system for injecting an agent for reducing oxides of nitrogen into an exhaust line of an internal combustion engine vehicle according to the invention.

Figure 4:
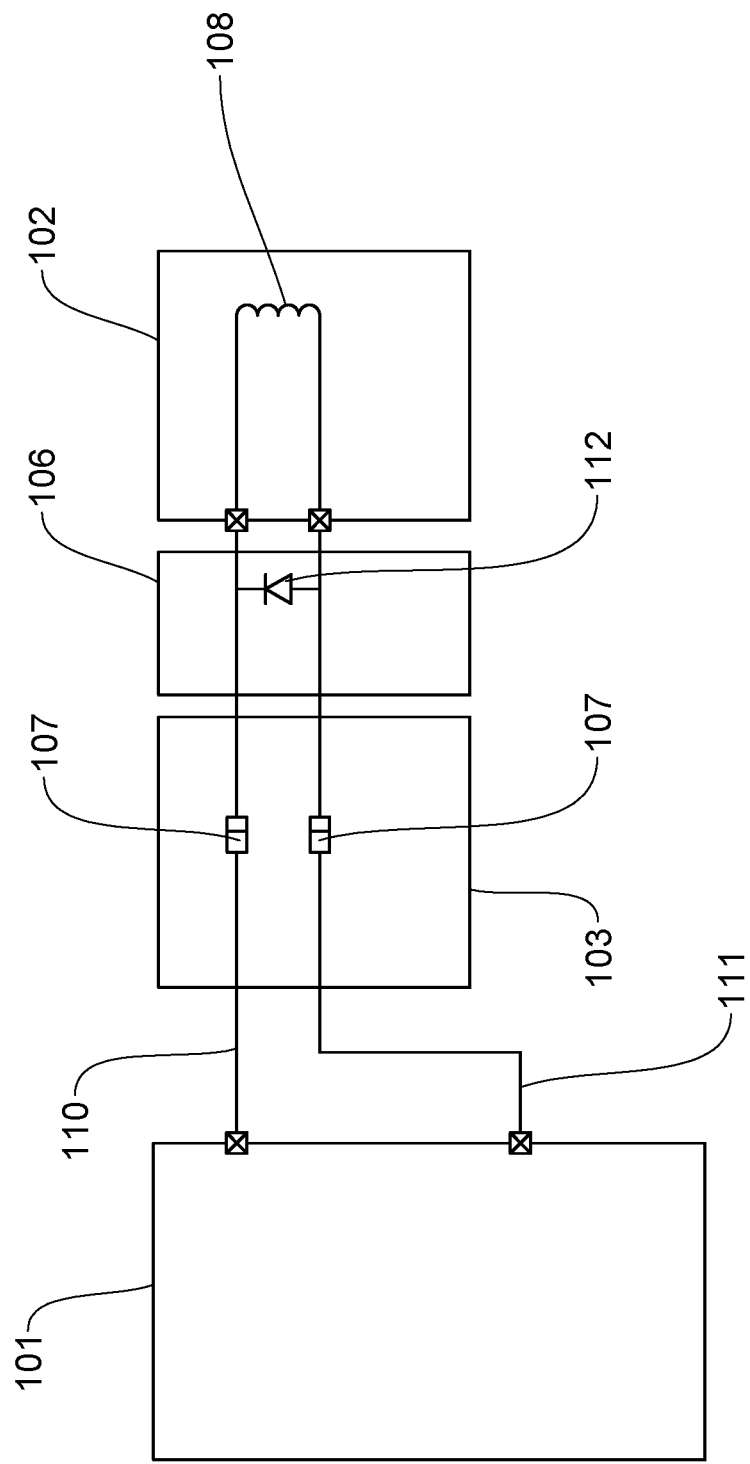

FIG. 4 shows a partial and simplified circuit diagram of a third exemplary embodiment of a system for injecting an agent for reducing oxides of nitrogen into an exhaust line of an internal combustion engine vehicle according to the invention.

Figure 1:
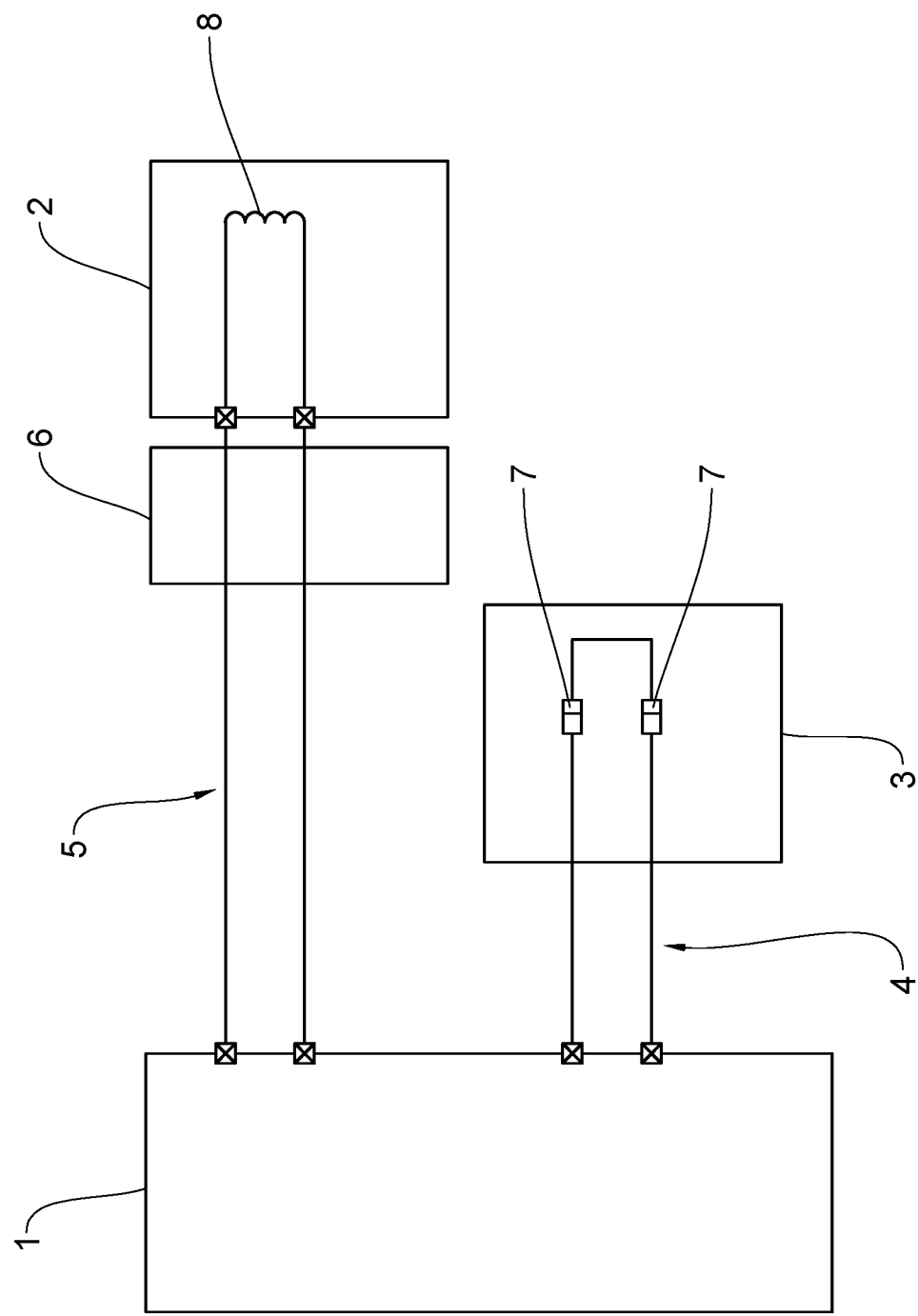
FIG. 1 shows a partial and simplified circuit diagram of one exemplary embodiment of a system for injecting an agent for reducing oxides of nitrogen according to the prior art.

FIG. 1 shows a partial circuit diagram of an injection system according to the prior art, in which it is represented symbolically, comprising:

a schematic circuit board 1 for controlling an injector 2 for introducing the reducing agent into an exhaust line (not shown) by injection and a pipe 3 for supplying the reducing agent, part of an electronic unit (not shown in FIG. 1) for driving both the injector 2 and a pump (not shown) for drawing the reducing agent from a tank (not shown) and introducing it into the exhaust line;

an electrical cable 4 for heating the pipe 3 for supplying the reducing agent;

an electrical cable 5 for controlling the injector 2, this cable 5 being, in this example, connected to the injector 2 by means of a connector 6.

Resistors 7 symbolically represent the electrical resistance of the electrical cable 4 for heating the pipe 3 for supplying the reducing agent.

An inductor 8 symbolically represents the actuator of the injector 2, in this example a solenoid, allowing the injector to be opened or closed via the electrical cable 5 for controlling the injector 2.

The electrical cable 5 for controlling the injector 2 and the electrical cable 4 for heating the pipe 3 for supplying the reducing agent are distinct and routed separately, as shown.

Figure 2:
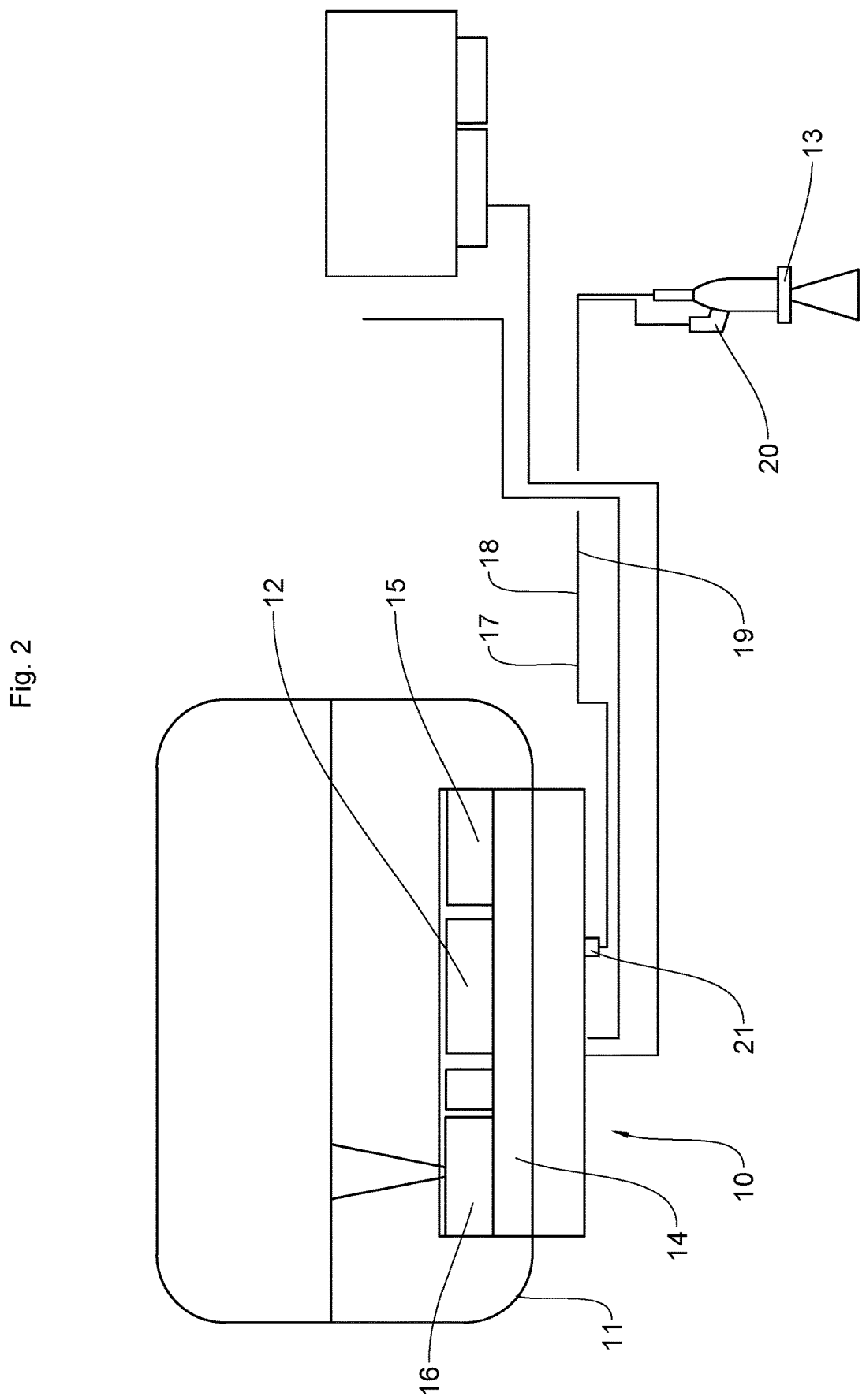
FIG. 2 shows a partial diagram of a first exemplary embodiment of a system for injecting an agent for reducing oxides of nitrogen into an exhaust line of an internal combustion engine vehicle according to the invention.

FIG. 2 shows one particular exemplary arrangement of the system for injecting an agent for reducing oxides of nitrogen into an exhaust line of an internal combustion engine vehicle (these are not shown) according to the invention. A pump module 10 associated with a tank 11 of reducing agent may be seen. The pump module 10 includes a pump 12 for drawing the reducing agent from the tank 11 and introducing it into the exhaust line (not shown) via an injector 13 for introducing the reducing agent into the exhaust line by injection, and an electronic unit 14 for driving both the pump 12 and the injector 13, which electronic unit is further provided with all known means for managing the system for injecting the reducing agent, in particular with means 15 for heating the reducing agent in the tank 11, with a level gauge 16 for measuring the level of the reducing agent in the tank 11, etc.

A pipe 17 for supplying the reducing agent links the pump 12 to the injector 13 via the pump module 10, as shown in this FIG. 2, the pump 12 being arranged a certain distance away from the injector 13 in the particular example shown in FIG. 2. An electrical cable 18 for heating the pipe 17 for supplying the reducing agent is housed in said pipe 17.

The electronic unit 14 for driving both the injector 13 and the pump 12 is arranged, in the example, in the pump module 10 and is connected to the injector 13 via an electrical control cable 19.

According to the invention, the electrical control cable 19 is associated with the pipe 17 for supplying the injector 13 with the reducing agent along its run linking the pump module to the injector 13, as shown in FIG. 2.

According to the example of FIG. 2, the electrical control cable 19 may be, alternatively according to a plurality of different variant embodiments of the invention:

affixed to the outer surface of the pipe 17 for supplying the injector with the reducing agent; or incorporated within the pipe 17 for supplying the injector 13 with the reducing agent, and in particular arranged within the hollow of the supply pipe 17 through which the reducing agent flows.

According to FIG. 2, the electrical control cable 19 is connected to the injector via a first connector 20, and is for example connected to the pump module 10 via a second, four-pin connector 21: two pins for the electrical control cable 19 and two pins for the electrical heating cable 18.

In FIG. 2, the electrical control cable 19 and the electrical heating cable 18 follow the same route from the pump module 10 to the injector 13.

The example according to FIGS. 3A, 3B and 3C shows a pipe 30 for supplying the injector with reducing agent on its own, the injector and the pump module not being depicted. A first end 31 is connected to the injector via a first lateral fluid connector 33, and the second end 32, opposite the first end, is connected to the pump module via a second lateral fluid connector 34.

FIGS. 3B and 3C illustrate cross sections through the supply pipe 30 at the two ends 31 and 32 along the lines BB and CC of FIG. 3A, respectively. The cross sections along the lines BB and CC are made after the fluid connectors 33 and 34 and as such do not show the hollow of the pipe 30 for the reducing agent.

FIGS. 3B and 3C show for example an electrical cable or wire 36 for heating the supply pipe 30, an electrical cable 35 or wire for controlling the injector and a common ground wire or electrical cable 37, all three of which are incorporated within the supply pipe 30.

FIG. 3A further schematically shows:
a first electrical connector 38 for electrically connecting the electrical cable 35 or wire for controlling the injector and the common ground wire 37 to the injector, the electrical connector 38 being positioned at the axial outlet of the first end 31 of the supply pipe 30; and
a second electrical connector 39 for electrically connecting the electrical cable 35 or wire for controlling the injector, the electrical heating cable or wire 36 and the common ground wire 37 to the pump module, the electrical connector 38 being positioned at the axial outlet of the second end 32 of the supply pipe 30.

The diagram of FIG. 4 shows a symbolic and partial circuit diagram of an injection system according to the invention, comprising:
a schematic circuit board 101 for controlling an injector 102 for introducing the reducing agent into an exhaust line (not shown) by injection and a pipe 103 for supplying the reducing agent, part of an electronic unit (not shown in FIG. 4) for driving both the injector 102 and a pump (not shown) for drawing the reducing agent from a tank (not shown) and introducing it into the exhaust line;
an electrical cable 110, 111 for heating the pipe 3 for supplying the reducing agent;
an electrical cable 110, 111 for controlling the injector 102, this cable 110, 111 being, in the example, connected to the injector 2 by means of a connector 106.

In this third embodiment of the invention according to FIG. 4, the electrical control cable and the electrical heating cable consist of a first single wire 110 and a second single wire 111 for the functionalities of heating the pipe 103 and of controlling the injector 102, the injection system further comprising, in proximity to the injector 102, or in the injector 102 itself, e.g. the body thereof (not shown), a diode means 112 connected between the first 110 and second 111 wires, in parallel with the actuator 108 of the injector 102, e.g. in the the connector 106 as shown, such that, the injection system comprising a device for reversing the control polarity according to any known means (not shown), e.g. arranged on the circuit board 101, in the reverse direction of the diode 112, i.e. from the wire 110 to the wire 111 in FIG. 4, the current flows through the actuator 108 of the injector 102, and, in the forward direction of the diode, i.e. from the wire 111 to the wire 110 in FIG. 4, the current shorts the actuator 108 of the injector 102 while providing the functionality of a cable for heating the pipe 103 by flowing through the diode 112 and the resistors 107.

In the example of FIG. 4, the injector 102 symbolically shown is a solenoid-operated injector, and the actuator 108 is therefore a self-inductance coil.

A method for injecting an agent for reducing oxides of nitrogen into an exhaust line of an internal combustion engine vehicle by means of an injection system according to FIG. 4 will now be described.

This method consists in particular in:
heating the pipe 103 for supplying the reducing agent without controlling the injector 102 according to a first control polarity of said device for reversing the control polarity (not shown in FIG. 4);
controlling said at least one injector 102 according to a second control polarity of the device for reversing the control polarity, which is the opposite of the first control polarity.

For example, the static flow rate of the injector will be chosen judiciously so as to achieve the required maximum flow rate of reducing agent, preferably in the following way:
the injector 102 is controlled by means of PWM control including a determined duty cycle of opening, preferably of less than 50%;
the pipe 103 for supplying the reducing agent is heated sequentially between the injector opening control phases by using the available time from the PWM control of the injector 102 preferably including a determined duty cycle of opening, preferably of less than 50%.

The invention claimed is:

1. A system for injecting an agent for reducing oxides of nitrogen into an exhaust line of an internal combustion engine vehicle, including:
a pump (12) for drawing the reducing agent from a tank and introducing it into the exhaust line;
at least one injector (13, 102) for introducing the reducing agent into the exhaust line by injection;
an electronic unit (14) for driving both said at least one injector and the pump;
a pipe (17, 30, 103) for supplying said reducing agent linking the pump to said at least one injector;
an electrical cable (18) for heating the pipe for supplying the reducing agent,
the pump being arranged a certain distance away from said at least one injector, and the electronic unit for driving both said at least one injector and the pump being arranged in a module (10) with the pump and connected to said at least one injector via an electrical control cable (19), wherein the electrical control cable (19, 35, 110) is associated with said pipe for supplying said at least one injector with the reducing agent, the electrical control cable and the electrical heating cable consisting of a first single wire (110) and a second single wire (111) for the heating and control functionalities for said at least one injector (102), the injection system further comprising, in proximity to said at least one injector, or in said at least one injector itself, a diode means (112) between the first (110) and second (111) wires, which is connected in parallel with the actuator (108) of said at least one injector such that, the injection system comprising a device for reversing the control polarity:
in the reverse direction of the diode means (112), the current flows through the actuator (108) of said at least one injector (102); and in the forward direction of the diode means (112), the current shorts the actuator (108) of said at least one injector (102) while providing the heating cable functionality.

2. The injection system as claimed in claim 1, wherein the electrical control cable (19, 35) is incorporated within the pipe (17, 30) for supplying said at least one injector with the reducing agent.

3. The injection system as claimed in claim 2, wherein the electrical control cable (19, 35) is arranged within the hollow of the supply pipe (17, 30) through which the reducing agent flows.

4. The injection system as claimed in claim 1, wherein the electrical control cable (19, 35) is affixed to the outer surface of the pipe (17, 30) for supplying said at least one injector with the reducing agent.

5. The injection system as claimed in claim 1, wherein the electrical control cable (35) and the electrical heating cable (36) share a common ground wire (37).

6. The injection system as claimed in claim 1, wherein the resistance of the actuator (108) is at least five times as high as the resistances (107) of the first (110) and second (111) single wires for the heating and control functionalities for said at least one injector (102).

7. The injection system as claimed in claim 1, wherein the static flow rate of the injector is dimensioned so as to achieve a required maximum flow rate of reducing agent by means of PWM control including a determined duty cycle of opening.

8. A method for injecting an agent for reducing oxides of nitrogen into an exhaust line of an internal combustion engine vehicle by means of an injection system as claimed in claim 1, comprising:
    heating the pipe (103) for supplying the reducing agent without controlling the injector (102) according to a first control polarity of said device for reversing the control polarity;
    controlling said at least one injector (102) according to a second control polarity of said device for reversing the control polarity, which is the opposite of the first control polarity.

9. The injection method as claimed in claim 8, wherein:
    said at least one injector (102) is controlled by means of PWM control;
    the pipe (103) for supplying the reducing agent is heated sequentially between the injector opening control phases by using the available time from the PWM control of said at least one injector (102).

10. The injection system as claimed in claim 1, wherein the resistance of the actuator is 10 times as high as the resistances of the first and second single wires for the heating and control functionalities for said at least one injector.

11. The injection system as claimed in claim 1, wherein the static flow rate of the injector is dimensioned so as to achieve a required maximum flow rate of reducing agent by means of PWM control including a duty cycle of opening of less than 50%.

12. The injection method as claimed in claim 8, wherein:
    said at least one injector is controlled by means of PWM control including a determined duty cycle of opening of less than 50%;
    the pipe for supplying the reducing agent is heated sequentially between the injector opening control phases by using the available time from the PWM control of said at least one injector including a determined duty cycle of opening of less than 50%.

13. The injection system as claimed in claim 2, wherein the electrical control cable and the electrical heating cable share a common ground wire.

14. The injection system as claimed in claim 3, wherein the electrical control cable and the electrical heating cable share a common ground wire.

15. The injection system as claimed in claim 4, wherein the electrical control cable and the electrical heating cable share a common ground wire.

16. The injection system as claimed in claim 2, wherein the resistance of the actuator is at least five times as high as the resistances of the first and second single wires for the heating and control functionalities for said at least one injector.

17. The injection system as claimed in claim 3, wherein the resistance of the actuator is at least five times as high as the resistances of the first and second single wires for the heating and control functionalities for said at least one injector.

18. The injection system as claimed in claim 4, wherein the resistance of the actuator is at least five times as high as the resistances of the first and second single wires for the heating and control functionalities for said at least one injector.

19. The injection system as claimed in claim 5, wherein the resistance of the actuator is at least five times as high as the resistances of the first and second single wires for the heating and control functionalities for said at least one injector.

20. The injection system as claimed in claim 2, wherein the static flow rate of the injector is dimensioned so as to achieve a required maximum flow rate of reducing agent by means of PWM control including a determined duty cycle of opening.

* * * * *